Aug. 24, 1943.     G. F. HUNTER     2,327,713
ANTISTATIC PHOTOGRAPHIC PACKAGE
Filed March 17, 1941
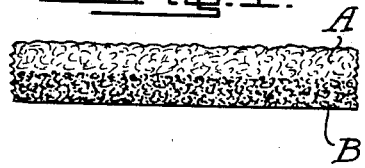
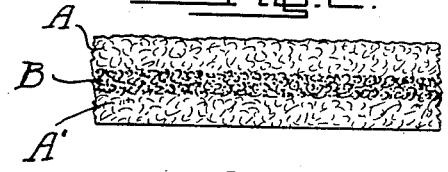
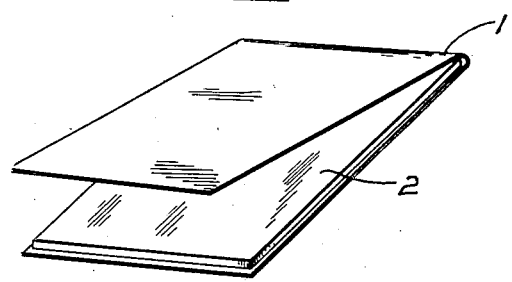
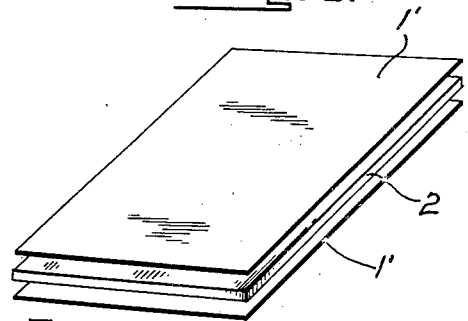
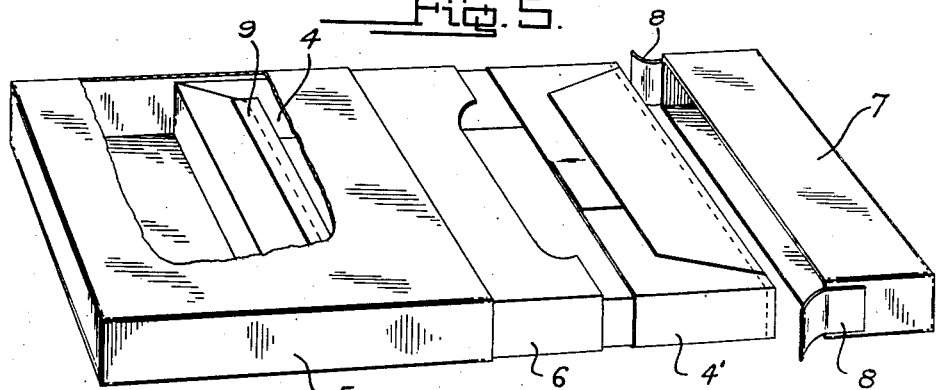
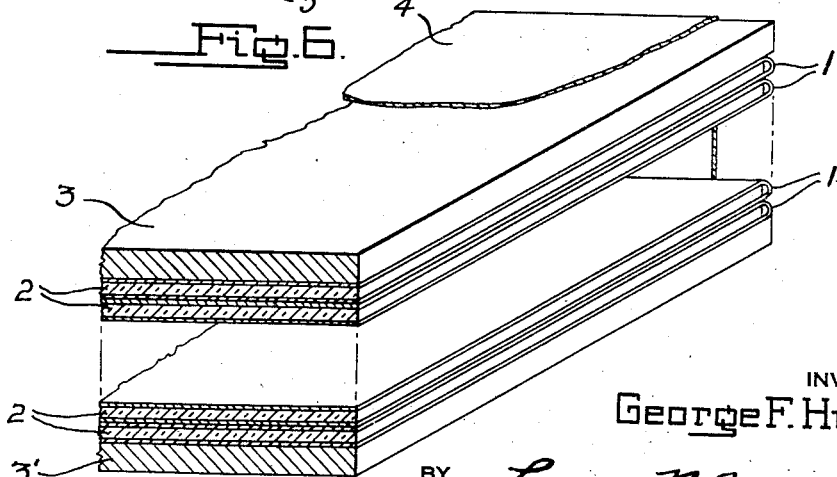
INVENTOR.
George F. Hunter
BY Lynn B. Morris
ATTORNEY Patented Aug. 24, 1943

2,327,713

UNITED STATES PATENT OFFICE 2,327,713

ANTISTATIC PHOTOGRAPHIC PACKAGE

George Francis Hunter, Woodbridge, N. J., assignor, by mesne assignments, to E. I. du Pont de Nemours & Company, Wilmington, Del., a corporation of Delaware Application March 17, 1941, Serial No. 383,881

10 Claims. (Cl. 206—62)

This invention relates to photography and more particularly to an improved package, protective sheets and wrapping material for photosensitive elements. Still more particularly it relates to an improved manner of packaging photo-sensitive elements and protecting the sensitive surfaces thereof.

An object of this invention is to provide a means for protecting the sensitive surfaces of photosensitive elements from the harmful effects of static electricity. Another object is to provide improved packages for a plurality of photosensitive elements. Yet another object is to provide an economical and easily assembled package for photo-sensitive elements which will eliminate static electricity and the harmful effects thereof. A further object is to provide novel and useful protective sheets or folders for photosensitive elements. Additional and more specific objects will more plainly appear from the following detailed description of the invention.

Photo-sensitive elements, especially film sheets, are packaged in lightproof containers and the photo-sensitive surfaces thereof protected against abrasive, frictional and other mechanical forces by various types of wrappers and interleaving protective sheets or folders. The protective sheets or folders which have been made of flexible paper are placed in contact with the photosensitive surfaces of the elements.

It has been found that in removing photo-sensitive elements from prior art packages and more particularly from the interleaving sheets and/or folders, that there is a tendency for static electricity to be generated by the friction of the contacting surfaces. The static electricity forms latent images and after the photo-sensitive elements have been exposed and developed, these latent images become photographic images of static markings which appear on the film in the picture. These images of static markings lead to confusion in reading the pictures, particularly in the case of where fine detail in radiographs is of importance to pathological findings, interpreting failures in metal castings, etc. They also cause sharp changes in the continuity of the photographic sound record, motion picture images, etc.

The many disadvantages in prior packages and protective sheets or wrappers and wrapping materials are effectively overcome by the present invention which involves the use of a flexible, lightproof wrapping paper composed of two or more strata of different characteristics, an outer one of which is soft, porous, resilient, non-abrasive, of reduced contact area and having a physical density of 0.50 to 0.70 as compared with water as 1.000 and a higher density stratum. The low density stratum is placed in contact with the photo-sensitized surfaces of the element.

The invention will be more readily understood by reference to the accompanying drawing, wherein like characters denote like parts throughout the several views.

Fig. 1 is an enlarged cross section of one type of paper useful for the protective sheets and wrapping materials of this invention.

Fig. 2 is an enlarged cross section of a modified type of paper useful for the protective sheets and wrapping materials of this invention.

Fig. 3 is a perspective view of a novel protective folder containing a film element.

Fig. 4 is a perspective view of a film element interposed between two protective sheets.

Fig. 5 is a perspective view of a number of film elements, each enclosed in the anti-static paper of this invention and in an assembled relationship to a box and cap closure.

Fig. 6 is an enlarged perspective view of a wrapped bundle of film elements showing certain parts in section.

In the drawing a duplex paper as shown in Figures 1 and 2 are composed of two strata A and B which are felted together so that the sheet is devoid of lines of jointure and does not separate upon flexure. The strata A and A' are of a soft, porous, resilient, non-abrasive paper stock of reduced contact area which is preferably given a color different from stratum B, and has a physical density of 0.60 to 0.70 as compared with water as 1.000. It may be colored grey, green, etc. with dyes or pigments, e. g., aniline dyes. The stratum B is composed of a higher density paper stock having a physical density of approximately 0.80 to 0.90 (relative to water as 1.000) and is made lightproof. It is preferably given a color different from stratum A for contrasting purposes and is preferably black. However, any color which will absorb the wave lengths of light to which the photo-sensitive layer is sensitive may be used. Suitable dyes and pigments, one or more of which may be used, are carbon black, aniline black, nigrosine, etc.

While good results are obtained within the ranges specified above, it has been found that the best results are obtained when the differences in density between the two strata are at least 10% and preferably at least 30%. The less dense of the strata is preferably uncoated and uncalendered, although the denser stratum may be coated and calendered if desired.

The duplex paper shown in Figs. 1 and 2 can be made in a number of ways, preferably by depositing on a continuously moving Fourdrinier wire screen in the usual manner, a base sheet or stratum A from a relatively long fibered, free, diluted pulp solution containing a paper stock suitable to form a layer having the characteristics specified above. The solution may contain a dye, e. g., a grey aniline. On layer or stratum A is deposited a slower or more concentrated pulp solution containing a relatively short fibered paper stock in substantial amount suitable to form a stratum B having the above-prescribed characteristics. This solution may contain the coloring ingredients necessary to opacify the sheet and render it lightproof and distinctive.

When a triple-felted paper is desired, a paper stock solution like that used for stratum A can be applied to layer B of a two strata paper as described in the preceding paragraph to form a layer A' in a similar manner resulting in a 3 ply paper as shown in Fig. 2. To facilitate interlocking of the fibers of the different layers, water or other suitable fluid or liquid can be supplied to the surface of each web prior to the superposing of another web thereon.

In one important aspect of the invention the multifelted paper is cut into sheets which are folded to form an interleaving folder 1 which has the soft low density layer on the inside. A photosensitized film element is placed in the folder as shown. A plurality of such units may then be placed in lightproof outer packages of various designs. A plurality of units may be first wrapped in a flexible wrapping sheet or tissue or inserted in envelopes before being placed in an outer package.

As shown in Figs. 5 and 6, protective paper boards 3 and 3' are placed on each side of a bundle of units. Sheets of flexible wrapping paper 4 and 4' are then placed around the assembled bundle and affixed in various manners, e. g., by adhesives, cord or sealing tape 9 as shown. Sheet 4' forms a cap member which extends a substantial length along wrapper 4. A single paper 4 may be used, however, to form a unitary wrapper which is folded and sealed at each end as shown in the left side of Fig. 5. The wrapped bundle of units can then be protected from jars, pressure, etc. by a wrapping of resilient material (corrugated cardboard) and inserted in an outer cardboard box consisting of a rectangular tube 5 having a recessed portion 6 over which is placed an interfitting cap closure 7 which may be held in closed position with sealing tape 8. However, when a small number of units are packaged the additional protective materials can be eliminated.

In the modification shown in Fig. 4, unfolded, interleaving sheets 1' and 1'' are used. The soft surfaces are maintained in contact with the photosensitized surfaces. One, or a plurality of such units, can be placed in a light proof package in the same manner as the interleaving folders above described.

The invention is, of course, not limited to the above-described modification and those shown in the drawings. On the contrary, the novel felted paper can be used with many types of packages. They may be used in roll films by providing two soft surfaces for contacting the photosensitive surfaces which may then be wrapped in lightproof foils or papers and placed in tubes or boxes as shown in U. S. Patent No. 1,698,058.

Various types of boxes other than the slidable cap type shown in Fig. 2 can be used. Thus, a hinged or liftcover box can be used for the outer package. Envelopes may also be used.

It has been found by exhaustive tests that the novel protective, flexible, wrapping materials hereof have effectively eliminated generation of static in film packages and the adverse effects thereof. The advantages thereof are of major importance for double coated films and plates, especially radiographic film packages, wherein the film elements have a photosensitized surface on each face thereof.

The invention is not limited to X-ray film elements, however, but may be used with roll and cut film of various types including single coated and dupli-coated types of camera film, portrait film, lithographic films and plates, etc., multilayer film, e. g., color film, etc.

This application is a continuation-in-part of my copending application, Serial No. 119,830, filed January 9, 1937, which was allowed on July 27, 1940, and abandoned March 27, 1941.

As many apparently widely different embodiments of this invention may be made without departing from the spirit and scope hereof, it is to be understood that the invention is not to be limited except as defined in the appended claims.

I claim:

1. A package for photo-sensitized elements comprising a lightproof container, at least one photo-sensitized element in said container having its photo-sensitized surfaces in contact with a surface of a felted, lightproof, flexible, antistatic wrapping paper, said surface being soft, resilient, non-abrasive, of reduced contact area and having a physical density relative to water as 1.00 of 0.60 to 0.70, another stratum of said felted paper being lightproof and having a physical density of 0.80 to 0.90.

2. A package comprising a lightproof container, a sheet of photographic material in said container, said sheet being enclosed in an envelope comprising a fold of paper which covers said sheet on both surfaces and along one edge, said envelope being composed of a felted, lightproof, antistatic, flexible, wrapping paper, the inner surface strata of said paper being soft, non-abrasive, resilient, of reduced contact area and having a physical density relative to water as 1.00 of 0.60 to 0.70 and the outer surface being a lightproof paper strata of 0.80 to 0.90 in physical density.

3. A package comprising a lightproof container, a sheet of radiographic film in said container, said sheet being enclosed in an envelope comprising a fold of paper which covers said film on both surfaces and along one edge, said envelope being composed of a felted, lightproof, antistatic, flexible, wrapping paper, the inner surface strata of said fold being soft, non-abrasive, resilient, of reduced contact area, colored grey, and having a physical density relative to water as 1.00 of 0.60 to 0.70 and the outer surface being a lightproof paper strata of 0.80 to 0.90 in physical density colored black.

4. A package comprising a lightproof container, a plurality of sheets of sensitized radiographic film in said package, each of said sheets being enclosed in an envelope comprising a fold of paper which covers it on both surfaces and along one edge, said envelope being composed of a felted, lightproof, antistatic, flexible, wrapping paper, the inner surface strata of said fold being soft, non-abrasive, resilient, of reduced contact area colored grey, and having a physical density relative to water as 1.00 of 0.60 to 0.70 and the outer surface being a lightproof paper strata of 0.80 to 0.90 in physical density colored black.

5. An interleaving paper element for photo-sensitized elements comprising a sheet of felted, lightproof, antistatic, flexible wrapping paper, the inner surface strata of said paper being soft, non-abrasive, resilient, of reduced contact area and having a physical density relative to water as 1.00 of 0.60 to 0.70 and the outer surface being a lightproof paper strata of 0.80 to 0.90 in physical density.

6. An interleaving folder for a photo-sensitive element comprising a fold of paper which is of sufficient area to cover both surfaces and one edge of a photo-sensitive sheet, said folder being composed of a felted, lightproof, antistatic, flexible wrapping paper, the inner surface strata of said paper being soft, non-abrasive, resilient, of reduced contact area and having a physical density relative to water as 1.00 of 0.60 to 0.70 and the outer surface being a lightproof paper strata of 0.80 to 0.90 in physical density.

7. In combination in a lightproof container, a photographic element in said container having at least one sensitized surface in contact with one surface of an antistatic wrapping paper, said surface being soft, non-abrasive, resilient and of reduced contact area, the other surface of said paper having a greater physical density than the surface thereof in contact with said element.

8. In combination in a lightproof container, a photographic element in said container having at least one sensitized surface in contact wtih one surface of a felted lightproof, anti-static wrapping paper, said surface being soft, non-abrasive, resilient and of reduced contact area, the other surface of said paper having a greater physical density than the surface thereof in contact with said element.

9. A photographic package comprising a lightproof container, a plurality of photo-sensitized elements in said container, interleaving sheets between the sensitive surfaces of said elements, said sheets being composed of a felted, lightproof, flexible, antistatic wrapping paper, the surface which is in contact with the photo-sensitive surfaces thereof being soft, resilient, non-abrasive of reduced contact area, and having a physical density relative to water as 1.00 of 0.60 to 0.70, another stratum of said felted paper being lightproof and having a physical density of 0.80 to 0.90, the differences in the densities of said layers being at least 30%.

10. A photographic package comprising a lightproof container, a plurality of photo-sensitized elements in said container, each of said elements being enclosed in an interleaving folder which covers each face and one end thereof, said folders being composed of a felted, lightproof, flexible, antistatic wrapping paper, the surface which is in contact with the photo-sensitive surfaces thereof being soft, resilient, non-abrasive, of reduced contact area, and having a physical density relative to water as 1.00 of 0.60 to 0.70, another stratum of said felted paper being lightproof and having a physical density of 0.80 to 0.90, the differences in the densities of said layers being at least 30%.

GEORGE F. HUNTER.